United States Patent Office 3,578,435
Patented May 11, 1971

3,578,435
METHOD FOR PROMOTING GROWTH OF AGRICULTURAL PLANT
Tsunezo Ushioda, Tokyo, and Katsuhiko Nonaka, Minoru Yasuhara, Katsuya Sato, Takeshi Inoi, and Hiroaki Ishibashi, Yokohama-shi, Kanagawa-ken, Japan, assignors to Chisso Corporation, Osaka, Japan
No Drawing. Filed Dec. 29, 1966, Ser. No. 605,541
Claims priority, application Japan, Jan. 27, 1966, 41/4,732; Mar. 26, 1966, 41/18,595; Nov. 17, 1966, 41/75,715
Int. Cl. A01n 9/22
U.S. Cl. 71—92
7 Claims

ABSTRACT OF THE DISCLOSURE

A method for promoting the growth of agricultural plant by contacting said plant with 2-oxo-4-methyl-6-ureido-hexahydropyrimidine (which is a condensation product of urea and acetaldehyde or crotonaldehyde) and/or 2-oxo-4-methyl-6-hydroxy-hexahydropyrimidine (which is a hydrolyzate of the former), especially in soilless culture or in foliage application.

---

This invention relates to a method for promoting growth of agricultural plants. More particularly, this invention relates to a method for promoting growth of agricultural plant by using 2-oxo-4-methyl-6-ureidohexahydropyrimidine (hereinafter it will be abbreviated as CDU) or its hydrolysate, 2-oxo-4-methyl-6-hydroxyhexahydropyrimidine (hereinafter it will be abbreviated as OMHP) or a mixture thereof. In one aspect the present invention relates to a method for promoting the growth of agricultural plants by applying CDU or OMHP in soilless culture. In another aspect, the present invention relates to a method for promoting the growth of agricultural plant by spraying an aqueous solution of CDU or OMHP upon foliage.

CDU has been known heretofore as a slow-releasing fertilizer but it has been applied to the soil, as it is, in a solid state (alone or as a mixture with other kind of fertilizer) only in the environment suitable for plants to grow i.e. suitable for soil microorganisms to grow. The reason of superior slow-releasing fertilizer effect shown by CDU when applied to the soil is evidently due to its low solubility in water and its decomposition mechanism. In the application of CDU, the hydrolysis of side chain, ureido radical and the ring-opening of pyrimidine nucleus by microorganisms proceed simultaneously and yielded ammonium nitrogen is utilized slowly and without waste.

However the application of CDU which has been highlighted as a slow-releasing fertilizer has been limited only to the place where microorganisms can live. The inventors of the present invention have directed their study to the problem whether or not CDU can be effectively applied to the environment where the living of microorganisms is extremely difficult. Surprisingly enough, it has now been found by such study that CDU has a growth promoting action to agricultural plants even in an amount negligible as an inorganic fertilizer. Subsequently it has been found that OMHP which is hydrolysate of CDU has also a similar growth promoting action to agricultural plants.

Accordingly, it is an object of the present invention to provide a method for promoting the growth of agricultural plants in the environment where the living of microorganisms is difficult. Such an object can be attained in accordance with the method of the present invention by the use of CDU or OMHP. In other words CDU or OMHP can promote the growth of agricultural plants even at in the environment where the decomposition of CDU or OMHP by various kinds of microorganisms is difficult and the action as a fertilizer is hardly possible. Briefly stated, the method of the present invention comprises supplying a culture solution having a relatively low concentration of CDU or OMHP to agricultural plants in soilless culture.

In the above-mentioned case, the CDU or OMHP is absorbed through the roots of plants. However it has been discovered by the present inventors that CDU or OMHP are taken up into the body of plant not only through the roots of plants but also through the foliage and thereby their growth is promoted when they are sprayed upon the foliage.

Accordingly, it is another object of the present invention to provide a method for promoting the growth of plant by applying the promotor through the foliar application. According to the method of the present invention, an aqueous solution of CDU having a concentration within the soluble range of CDU (usually lower than 880 p.p.m.) alone or together with other foliar spray agent including extenders is sprayed directly upon the body of agricultural plant to promote its growth. Since OMHP is very soluble in water, an aqueous solution of this compound can likewise be sprayed directly alone or together with other foliar spray agent.

When the ureido radical of the side chain of CDU is decomposed in an aqueous solution, it naturally yields urea which shows a fertilizer effect as a nitrogen source. However, the hydrolysis of CDU is only promoted at a pH lower than 5. Since the pH of the culture solution commonly used in soilless culture, is in the range of 5.5 to 6.5, the degree of hydrolysis is very small in the culture solution. Further since there is no effective carbon source for microorganism, the decomposition due to microorganisms is negligible.

It may happen that plants absorb CDU directly and decompose it to utilize as a nitrogen source. However, as shown in the following case of control in which CDU is present abundantly in a solution as a nitrogen source, does not show much difference from that in which any nitrogen is not present.

It is worthy of note that CDU or OMHP is a novel kind of growth-promoting agent which shows different physiological activities from other kinds of plant hormones such as gibberellins, indoleacetic acid, 2,4-D and auxin in the following points;

(i) CDU or OMHP does not produce malformation and other harmful action.
(ii) It shows no reaction to cotyledon petiole, in other words, it has no activity in the common testing method for hormone activity such as Avena test.
(iii) It does not show sharp reaction in a short time, but when used for a long time, it shows remarkable growth promoting activity.
(iv) The growth promoting action is particularly pronounced when applied at the living condition or environment which is disadvantageous for plants to grow.
(v) It can be used for a wide variety of plants from higher plant to microorganism.

As regards the concentration of CDU or OMHP used in the present method, it varies depending upon the kind of plant or the condition of growth but in the case of soilless culture, in other words, hydroponics, a concentration ranging from about 1 to 200 p.p.m. and in the case of foliar spray, a concentration of more than 50 p.p.m. preferably from 100 to 200 p.p.m. is used.

It goes without saying both CDU and OMHP can be used with other fertilizer in a solid state or in the state of solution.

Following control and examples relative to the hydroponics and foliage application are given to illustrate the present invention but it should be understood that they are not intended to limit the method of the present invention.

CONTROL

Effectiveness of CDU as a nitrogen source for hydroponics of radish (*Raphamus sativus*). A hydroponic solution of Mr. Kasugai were prepared from Solutions A and B.

Solution A $NH_4NO_3$—363 g.
$KH_2PO_4$—242 g.
$KCl$—273 g.
and $MgSO_4 \cdot 7H_2O$—1544 g.

were dissolved in demineralized water to give 14 l. solution.

Solution B $Ca(NO_3)_2$—739 g.
HCl (1:3)—700 ml.
and $FeCl_3$ (6%)—1685 ml.

were dissolved in demineralized water to give 14 l. solution.

A culture solution was prepared by taking up each 20 ml. of solutions A and B, adding 9 l. of city water thereto and adjusting the pH to 6. 500 ml. of resultant solution was introduced into a 1 l. porcelain pot. The renewal of the culture solution was carried out every 5 days without aeration.

As for the radishes used in the test, seedlings were at first grown by the hydroponics on the sand bed in the state of no fertilizer and then 5 of them at the state of about 10 cm. length were transplanted in a pot and data were obtained from the total value of 4 pots. During the initial two weeks of hydroponic culture, cultivation was carried out in the order of demineralized water→¼ concentration of the original hydroponic solution→½ concentration→¾ concentration while stepwise increasing the concentration. The hydroponic culture was started from June 22, and the crops were harvested on July 22. The dry weight and total nitrogen of the crops were measured. Total amounts of 4 pots are calculated and shown in the following table.

| | Dry weight (g.) | Total nitrogen (g.) |
|---|---|---|
| Culture solution (1) | 1.39 | 49.0 |
| Solution (2) not containing nitrogen in which $NH_4NO_3$ and $Ca(NO_3)_2$ are removed from the solution consisting of A and B | 0.62 | 15.3 |
| Solution whose nitrogen amount is equivalent to that of culture solution (1) and which is obtained by adding CDU to the solution (2) | 0.69 | 17.1 |

EXAMPLE 1

The effectiveness of CDU on promoting the growth of radish (*Raphamus sativus*) in a hydroponic culture was experimented as in the case of control. The culture period was from August 9 to September 13. The results are shown in the following table.

| Amount of CDU added | Dry weight (g.) | Total nitrogen (g.) |
|---|---|---|
| Culture solution | 0.72 | 35.9 |
| Culture solution plus 5 p.p.m. CDU | 1.25 | 49.7 |
| Culture solution plus 50 p.p.m. CDU | 1.06 | 46.6 |
| Culture solution plus 125 p.p.m. CDU | 0.91 | 41.8 |

EXAMPLE 2

The effectiveness of CDU on promoting the growth of oat (*Avena sativa*) in a hydroponic culture.

The composition and the content (mg.) of constituents in 1 l. of the culture solution were as follows:

| | |
|---|---|
| $NH_4NO_3$ | 142.9 |
| $KNO_3$ | 36.1 |
| $Ca(NO_3)_2$ | 29.3 |
| $MgSO_4 \cdot 7H_2O$ | 229.2 |
| $KH_2PO_4$ | 191.5 |
| $K_2SO_4$ | 191.5 |
| $CaCl_2 \cdot 2H_2O$ | 253.9 |
| $FeCl_3$ | Small amount |
| Silicic acid sol | Small amount |

Three seedlings raised in a hydroponic culture on the sand bed, were planted in a pot and data were obtained in 4 replicates. The culture was carried out in a green house at a temperature of 15°–20° C. for 20 days as in the cases of control and Example 1. The average values from the 4 replicates are shown in the following table.

| Concentration of CDU added | Weight of fresh substance (g.) | Dry weight (g.) | Total length (cm.) | Total nitrogen (mg.) |
|---|---|---|---|---|
| Culture solution | 1.30 | 0.192 | 30.7 | 4.64 |
| Culture solution plus 10 p.p.m. CDU | 1.70 | 0.234 | 34.5 | 6.43 |
| Culture solution plus 50 p.p.m. CDU | 1.82 | 0.246 | 35.8 | 6.70 |

EXAMPLE 3

The effectiveness of CDU on the growth of wheat (*Triticum sativum*) in a hydroponic culture.

The culture solution and cultivating method were the same as in Example 2 but the culture period was 30 days.

| Concentration of CDU added | Weight of fresh material (g.) | Dry weight (g.) | Total nitrogen (mg.) |
|---|---|---|---|
| Culture solution | 4.3 | 0.49 | 17.2 |
| Culture solution plus 5 p.p.m. CDU | 4.6 | 0.52 | 18.0 |
| Culture solution plus 10 p.p.m. CDU | 5.1 | 0.61 | 21.0 |

EXAMPLE 4

Radishes (*Raphamus sativus*) which had passed one month after seeding were subjected to a hydroponic culture by using the following culture solution:

| | Mg./l. |
|---|---|
| $NH_4NO_3$ | 57 |
| $KH_2PO_4$ | 38 |
| KCl | 43 |
| $MgSO_4 \cdot 7H_2O$ | 244 |
| $Ca(NO_3)_2$ | 117 |
| $FeCl_3$ (6%) | 266 |
| pH, ca. 6.0. | |

After two weeks of the hydroponic culture, an aqueous solution of CDU containing an extender was sprayed upon the foliage in an amount of 2 ml./one pot. Spraying was repeated every six days. In the third and the fourth spraying, the amount of solution was each 4 ml. In 23 days after the first spraying, the radishes were harvested. Six plants were raised in one pot and the results shown in the following table are averages of 4 pots.

| Concentration of CDU added | Weight of fresh material (g.) | Dry weight (mg.) | Total nitrogen (mg.) |
|---|---|---|---|
| Control (CDU none) | 9.2 | 919 | 38.4 |
| CDU 100 p.p.m | 11.8 | 1,294 | 45.0 |
| CDU 200 p.p.m | 10.6 | 1,074 | 44.4 |

In spite of sufficient nitrogen source in the culture solution, both the weight of fresh material and dry weight are notably increased compared with the control, which can be understood due to the growth promoting action of CDU.

EXAMPLE 5

The effectiveness of OMHP on the growth of radishes (*Raphamus sativus*) in a hydroponic culture.

The following culture solution was used for this purpose.

|  | Mg./l. culture solution |
|---|---|
| $NH_4NO_3$ | 57 |
| $KH_2PO_4$ | 38 |
| $KCl$ | 43 |
| $MgSO_4 \cdot 7H_2O$ | 244 |
| $Ca(NO_3)_2$ | 117 |
| $FeCl_3$ (6%) | 266 | pH, ca. 6.0.

250 ml. of the above-mentioned culture solution was introduced in a 500 ml. porcelain pot. The radishes were raised at first in the state of hydroponic culture on the sand bed containing no fertilizer. When the radishes grew up to about 10 cm., 5 of them were set in one pot. Aeration was not carried out. The renewal of the culture solution was repeated every 5 days and averages of 4 replicates were calculated. After cultivating for 30 days in a green house at a temperature of 15°–20° C., the crops were harvested. After measuring both the lengths of crops above the ground and under the ground, dry weight and total nitrogen were measured. The results shown in the following table are averages of 4 pots.

| Concentration of added OMHP | Part above the ground (cm.) | Part under the ground (cm.) | Dry weight (mg.) | Total nitrogen (mg.) |
|---|---|---|---|---|
| Control OMHP none | 11.5 | 15.4 | 204.0 | 9.1 |
| Culture solution plus OMHP 5 p.p.m. | 12.1 | 26.0 | 262.4 | 11.4 |
| Culture solution plus OMHP 10 p.p.m. | 12.0 | 26.5 | 280.3 | 11.9 |
| Culture solution plus OMHP 50 p.p.m. | 12.8 | 28.4 | 295.1 | 13.0 |

EXAMPLE 6

The effectiveness of OMHP on the growth of oat (*Avena sativa*)

The following culture solution was used for this purpose.

|  | Mg./l. of culture solution |
|---|---|
| $NH_4NO_3$ | 142.9 |
| $KNO_3$ | 36.1 |
| $Ca(NO_3)_2$ | 29.3 |
| $MgSO_4 \cdot 7H_2O$ | 229.2 |
| $KH_2PO_4$ | 191.5 |
| $K_2SO_4$ | 191.5 |
| $CaCl_2 \cdot 2H_2O$ | 253.9 |
| $FeCl_3$, small amount. | |
| Silicic acid sol, small amount. | |

Three oats were planted in one pot. The cultivation period was 25 days. Other experimental conditions were the same as in Example 5.

| Concentration of added OMHP | Part above the ground (cm.) | Part under the ground (cm.) | Dry weight (mg.) | Total nitrogen (mg.) |
|---|---|---|---|---|
| Control | 22.6 | 9.1 | 204 | 4.83 |
| Culture solution plus OMHP 5 p.p.m. | 23.0 | 11.8 | 243 | 6.73 |
| Culture solution plus OMHP 10 p.p.m. | 23.3 | 12.1 | 248 | 6.80 |

EXAMPLE 7

The effectiveness of OMHP on the growth of radishes (*Raphamus sativus*) by way of foliage application.

By using the culture solution of Example 5, radishes were raised for 2 weeks in a hydroponic culture as in Example 5. 2 ml. per pot of aqueous solution of OMHP containing a small amount of extender was uniformly sprayed upon the part of the radishes above the ground. Thereafter spraying was repeated every 6 days. (4 ml. of solution was sprayed every time after the second spraying.) In 25 days from the first spraying, the radishes were harvested. 5 radishes were planted in one pot and dry weights and total nitrogens in averages of 4 pots were measured and shown in the following table.

| Concentration of added OMHP | Dry weight (mg.) | Total nitrogen (mg.) |
|---|---|---|
| Control | 884 | 32.6 |
| Concentration of the aqueous solution OMHP 50 p.p.m. | 1,132 | 42.0 |
| Concentration of the aqueous solution OMHP 100 p.p.m. | 1,208 | 44.8 |

What is claimed is:

1. A method for promoting the growth of an agricultural plant which comprises contacting the said plant in a soilless culture with at least one member selected from the group consisting of 2-oxo-4-methyl-6-ureido-hexahydropyrimidine and 2-oxo-4-methyl-6-hydroxy-hexahydropyrimidine in an amount sufficient to promote the growth of said plant.

2. The method of claim 1 wherein said member is 2-oxo-4-methyl-6-ureido-hexahydropyrimidine.

3. The method of claim 1 wherein said member is 2-oxo-4-methyl-6-hydroxy-hexahydropyrimidine.

4. The method of claim 1 wherein said soilless culture contains an aqueous solution having from about 1 to 200 p.p.m. of 2 - oxo-4-methyl-6-ureido-hexahydropyrimidine or 2-oxo-4-methyl-6-hydroxy-hexahydropyrimidine.

5. A method for promoting the growth of an agricultural plant which comprises contacting the said plant by way of foliage application with at least one member selected from the group consisting of 2 - oxo-4-methyl-6-ureido-hexahydropyrimidine and 2 - oxo - 4 - methyl-6-hydroxy-hexahydropyrimidine in an amount sufficient to promote the growth of said plant.

6. The method of claim 5 wherein said foliage application is carried out by using an aqueous solution containing from 100 to 200 p.p.m. of 2-oxo-4-methyl-6-ureido-hexapropyrimidine or 2-oxo-4-methyl-6-hydroxy-hexahydropyrimidine.

7. The method of claim 5 wherein said member is 2-oxo-4-methyl-6-ureido-hexahydropyrimidine.

References Cited

UNITED STATES PATENTS

| 3,190,741 | 6/1965 | Brandeis et al. | 71—11 |
| 3,190,742 | 6/1965 | Brandeis et al. | 71—11 |
| 3,450,703 | 6/1969 | Peterson | 71—92X |

JAMES O. THOMAS, JR., Primary Examiner

U.S. Cl. X.R.

47—1.2